Feb. 3, 1970 H. DA SILVA 3,493,678

CHANNEL SELECTING TELECOMMUNICATION SYSTEM WITH AUTOMATIC ERROR CORRECTION BY REPETITION

Filed Dec. 30, 1966 3 Sheets-Sheet 1

INVENTOR.
HERMAN da SILVA
BY
Hugh A. Kirk
ATT'Y.

INVENTOR.
HERMAN da SILVA
BY
Hugh A. Kirk
ATT'Y.

Feb. 3, 1970 H. DA SILVA 3,493,678

CHANNEL SELECTING TELECOMMUNICATION SYSTEM WITH AUTOMATIC ERROR CORRECTION BY REPETITION

Filed Dec. 30, 1966 3 Sheets-Sheet 3

INVENTOR.
HERMAN da SILVA
BY Hugh A. Kirk
ATT'Y.

United States Patent Office 3,493,678
Patented Feb. 3, 1970

3,493,678

CHANNEL SELECTING TELECOMMUNICATION SYSTEM WITH AUTOMATIC ERROR CORRECTION BY REPETITION

Herman Da Silva, Voorburg, Netherlands, assignor to De Staat der Nederlanden, Ten Deze Vertegenwoordigd Door de Directeur-Generaal der Posterijen, Telegrafie en Telefonie, The Hague, Netherlands Filed Dec. 30, 1966, Ser. No. 606,350
Int. Cl. H04l 5/02
U.S. Cl. 178—50 20 Claims

ABSTRACT OF THE DISCLOSURE

This invention comprises a "varioplex" multi-channel multi-subscriber telecommunication system having automatic error detection and correction by repetition for signals between two stations, including storing means for each subscriber's signals, matrix means for each subscriber in each channel scanned at regular intervals by two shift registers for selecting available channels for waiting subscribers, a cross-bar type switch controlled by said matrix for connecting said subscribers to available channels, and means for preventing such connections of any such channel at any said interval if a repetition for correction is in process.

BACKGROUND OF INVENTION

A repetition device for the correction of mutilated signals comprises a part of the transmitter terminal or station and a part of the receiving terminal or station and is actuated by a faulty received signal, or by a request for repetition. Such a repetition device generates a so-called "repetition cycle" of a predetermined number of character cycles or distributor revolutions depending upon the duration and the propagation times for a signal. A "character cycle" or a "distributor cycle" is defined as the duration of one character or the time required to complete one character transmission, and hereinafter this character cycle or distributor revolution will be referred to as a "revolution."

Systems in which different subscribers can use a given complexity of physical channels, are known as "varioplex." The changing over of subscribers is normally achieved by using a predetermined time interval or a predetermined number of characters transmitted.

This method however cannot be used with equipment employing automatic error correction by means of repetition cycles. The said method fails when the switching-over moment coincides with a running repetition cycle, since the signals retransmitted as a result of a request for repetition will be fed to the newly connected subscriber. This invention provides means to overcome this difficulty.

SUMMARY OF INVENTION

Generally speaking, the telecommunication system of this invention comprises an adjustable link for a number of synchronized type printing telegraph channels which system normally distributes automatically at regular predetermined intervals all the eligible simplex traffic (that is, traffic in one direction at a time) subscribers among all the available duplex traffic (that is, traffic in both directions at the same time) channels, except for one or more channels in repetition, and then the distribution interval for those channels is automatically delayed one or more repetition cycle periods until the repetition in that channel is completed.

Such a system includes a transmitter and receiver at each station, an automatic error detector and repetition device for each channel in each station, a plurality of $n$ subscribers connected to each station, and about $n/2$ duplex channels between the stations, and means for employing both paths of the duplex channel for transmission of signals of any pair of simplex communicating subscribers.

In addition to these general features of this multi-channel telecommunicating system, this invention includes means connected to each subscriber for storing signals from each subscriber up to a given amount, say 25 words or 125 characters, means for selecting a free path in any channel for that subscriber having signals already stored for communication, and a counter means for permitting the connection of that subscriber's stored signals to an available channel only at predetermined intervals and under the control of the repetition device associated with that channel.

This selecting means comprises a channel-subscriber alloting matrix of trigger circuits controlled by two ring counters along adjacent sides of the matrix, one ring counter having steps corresponding in number to the number of channels or half of the number of $n$ subscribers, and the other ring counter having steps corresponding in number to the number of subscribers $n$ connected to that station. This matrix then controls a cross-bar switch which connects the stored signals awaiting transmission to the transmitter of that particular selected or allotted channel. This matrix is completely scanned by both ring counters each predetermined interval during which interval new channels may be set up or allotted, and these subscribers are connected to these allotted channels at this interval, provided a repetition cycle for error correction in that channel is not in progress. However, if a channel is in repetition its participation in the distribution is postponed for that channel until that channel is not in repetition, namely a predetermined whole fraction of the interval period thereafter, specifically a repetition cycle period.

Similar selecting means are provided at the receiving station which means are responsive only to the addresses of each subscriber being called, which addresses are transmitted right after each said distribution interval at the transmitting station.

The requisite AND- and OR-diode or rectifier circuits are provided with triggers to insure these selecting operations, as will be described below in the detail description of this invention.

Objects and advantages

Accordingly, it is an object of this invention to produce a varioplex multi-channel telecommunication system with automatic error detection and correction having a repetition cycle, in which no characters are lost when switching over from one channel to another, because there is means provided to prevent such switching-over when a repetition cycle is in progress.

Another object is to provide such a varioplex multi-channel system in which all non-repeating channels are switched-over at predetermined intervals.

BRIEF DESCRIPTION OF THE VIEWS

The above mentioned and other features and objects of this invention and the manner of attaining them will become more apparent and the invention itself will be understood best by reference to the following description of an embodiment of the invention taken in conjunction with the accompanying drawings, wherein.

Figure 1:
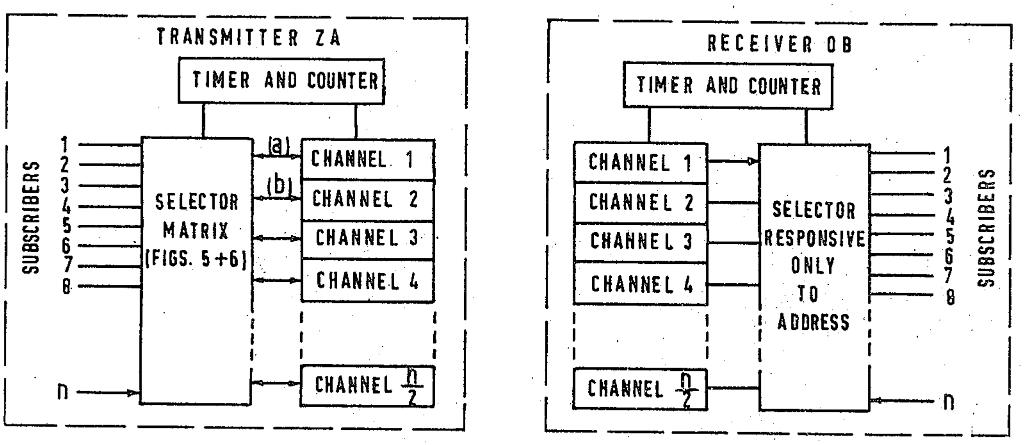
FIG. 1 is a general schematic block diagram of a multi-channel varioplex system according to an embodiment of this invention.
Figure 2:
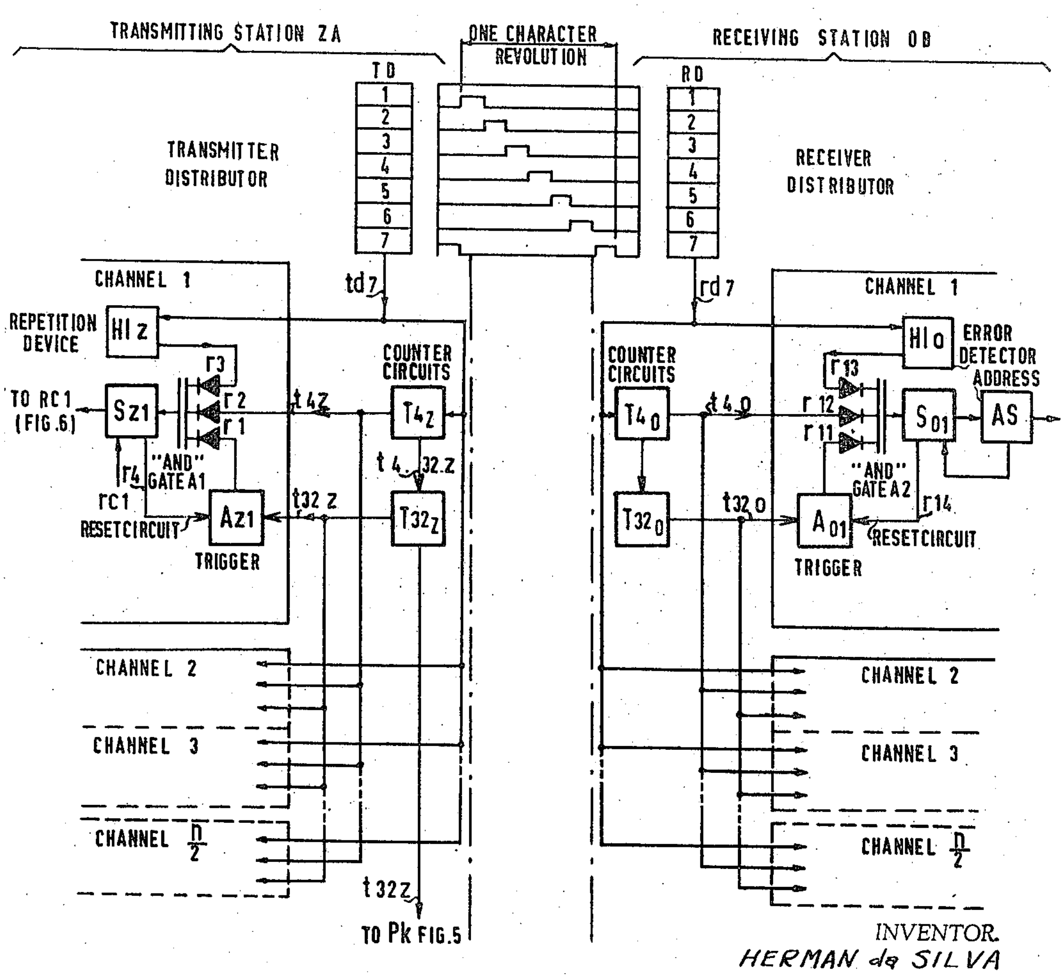
FIG. 2 is a schematic block wiring diagram of part of FIG. 1 showing the counter circuits and distributors at the transmission and receiving stations for the repetition devices connected to the plurality of subscriber's channels.
Figure 6:
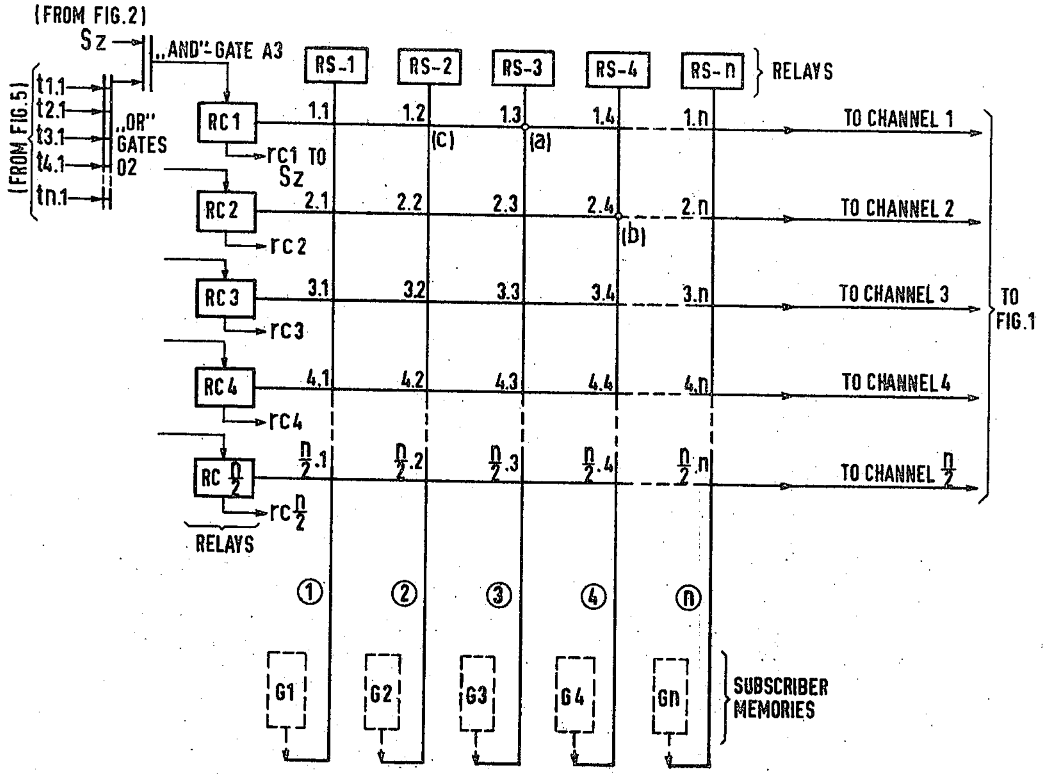
Figure 5:
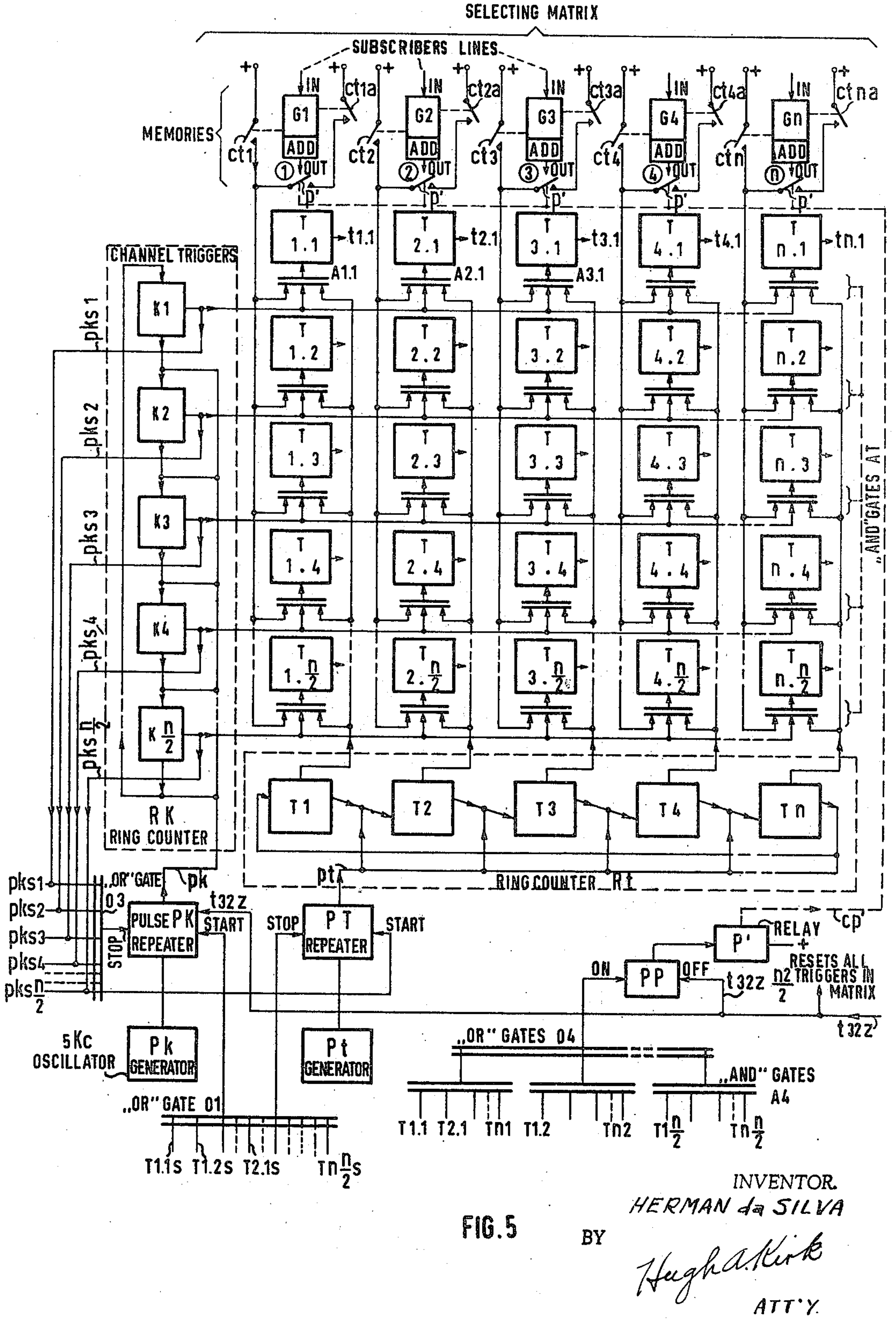

FIG. 5 is a schematic block wiring diagram of part of the transmitter selecting circuit matrix at the line terminations of the subscriber channels shown in FIGS. 1 and 2; and FIG. 6 is a schematic wiring diagram of a cross-bar type switch operated by the matrix circuit of FIG. 5 in another part of the transmitter selector circuit shown in FIG. 1, for connecting the selected subscriber to an available channel.

DETAILED DESCRIPTION

According to the invention, providing $n=a\times m$, in which $n$ is the number of subscribers at a station, $a$ is a whole number, and $m$ the number of steps in a repetition cycle, a desired connection between two subscriber stations is always maintained for the duration of $n$ consecutive rotations or steps, or during a whole number of repetition cycle times. The proportion of the number of subscribers' stations always grouped in a fixed relation to the number of available channels depends upon the traffic intensity of the subscribers' stations. In the most favorable cases of simplex traffic or duplex traffic (namely traffic in both directions at the same time) the intensity amounts to 100% or 50%, respectively, for which $n/2$ channels must be provided.

The change-over circuits in general

In FIG. 1 there are schematically shown in blocks, a transmitter and a receiver at separate stations ZA and OB with $n/2$ duplex channels between them. These channels are connected to matrix selector circuit SMT and address selector circuit SMR at the transmitter and receiver stations A and B, respectively, to which $n$ subscribers at each station are connected. These selector circuits SMT and SMR at each station are also connected to all of the $n/2$ channels through common timer and counter circuits TCT and TCR, respectively.

FIG. 2 is the block diagram of one path for a link designed for thirty-two (32) subscribers' stations. Station ZA is the transmitting end, and station OB is the receiving end of the circuit. The common equipment provided in the two stations for all the sixteen (16) receiving and transmitting channels is also shown.

This common equipment includes counter circuits $T4_z$ and $T32_z$ controlled by the transmitting distributor TD at the transmitting terminal, and counter circuits $T4_0$ and $T32_0$ controlled by the receiving distributor RD at the receiving terminal, which counters determine the moments at which subscribers can be connected or reconnected to, or distributed or redistributed among the channels. This connection is determined by means of the equipment connected to the individual channels at the transmitting and receiving ends, or at stations ZA and OB, respectively. If necessary, a change-over circuit can be provided to give any subscriber who does not have the required number of stored signals, the opportunity to make use of a channel in the case that all of the $n/2$ channels are not in use.

For this purpose the transmitting counter circuits $T4_z$ and $T32_z$, which are the only ones which can initiate such a distribution of the channels, apply pulses to switching time indicating triggers $Sz^1$ through $Szn/2$ (one for each channel circuit, that is, $n/2=16$). Each channel trigger Sz, however, only produces a switch-over pulse when a suitable voltage is also applied to it via its AND-gate A1 consisting of diodes $r1$, $r2$ and $r3$. The potential applied via the diode or rectifier $r3$ comes from the repetition device HIz when it is in its normal or inactive position; and the potentials or pulses applied via diodes or rectifiers $r1$ and $r2$ come from the counter circuits or timing units $T4_z$ and $T32_z$, respectively, with the latter pulse being controlled by the trigger Az.

Thus, the transmitting part ZA has a central counter $T4^z$ which counts off transmitting distributor cycles of four revolutions and delivers a pulse $t4z$ to each of the sixteen (16) channels every four revolutions. At the same time, counter $T4_z$ controls another counter $T32_z$, which at every eighth pulse received from $T4_z$, that is, once in thirty-two (32) revolutions, also delivers a pulse $t32z$ to each of the sixteen (16) channels. In each channel, trigger Az is changed over to its "on"-state at every $t32z$ pulse, which $t32z$ pulse always coincides with a $t4z$ pulse. The AND-gate A1, consisting of rectifiers $r1$, $r2$ and $r3$, then changes trigger Sz into its "on" state, if: trigger Az is in its "on" state (connected to rectifier $r1$), pulse $t4z$ appears (connected to rectifier $r2$), and the repetition device HIz is not active (connected to rectifier $r3$). When the trigger Sz operates, trigger Az goes back to its "off" state via its reset circuit connection $r4$.

Accordingly, every time a channel trigger Sz is operated, there is a switching-over possibility for that subscriber's station.

However, in the case of a repetition cycle in that channel, no switching-over occurs. Thus when a channel is in repetition, the appearance of a pulse $t32z$ will operate trigger Az, but trigger Sz will not be operated. However, after the next pulse $t4z$, which appears after the repetition device has stopped or the repetition cycle is over, trigger Sz will then operate and is put into its "on" state, which via circuit $r4$ operates the trigger Az back into its "off" state where it remains until the next pulse $t32z$ turns it on again. When the switching-over operation has become completed, the trigger Sz changes back into its "off" state via reset input conductor RC1 from relay RC1 in FIG. 6 which will be described later.

An analogous system, in which the counters $T4_0$ and $T32_0$ at the receiving end run synchronously with the transmitter counters $T4_z$ and $T32_z$, insures the switching-over at the same time by means of triggers $So1$ through $Son/2$ controlled by their AND-gates A2 consisting of diodes or rectifiers $r11$, $r12$, and $r13$, which control their selectors AS in combination with address signals.

Figure 3:
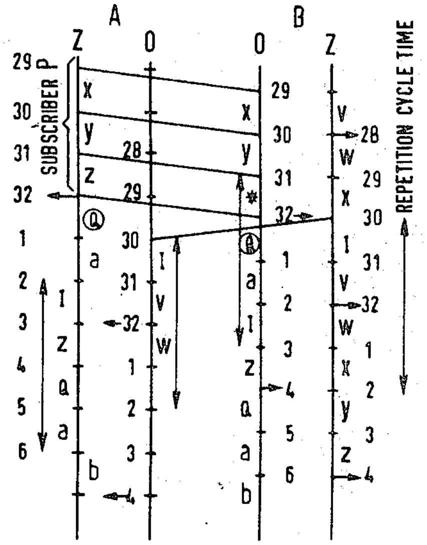
FIG. 3 is a schematic time diagram of the operation of signals in one channel between two stations, while changing subscribers when a disturbance requiring repetition occurs during the last signal of the sending subscriber.
Figure 4:
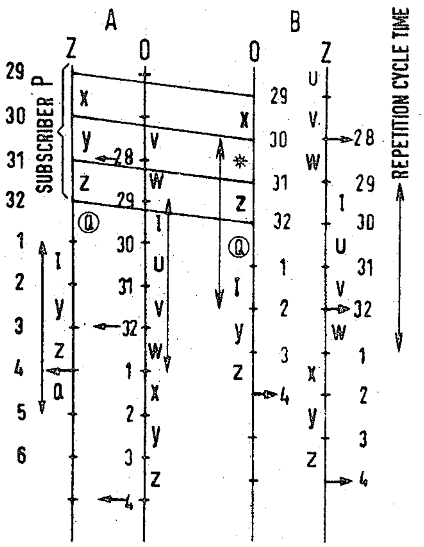
FIG. 4 is a schematic time diagram similar to FIG. 3 but of an operation wherein the disturbance occurs in the next to the last signal of the sending subscriber before change-over is to occur.

FIGS. 3 and 4 are time diagrams showing that switching-over never occurs before: (1) the repetition devices are in their "off" states, (2) the thirty-second (32nd) revolution pulse has passed, and (3) the pulse at 4 appears on a $t4z$ pulse. The possible switch-over moments are indicated by the heavier horizontal arrows in these diagrams.

In FIG. 3 it is supposed that the last signal "z" from the subscriber P is received mutilated (see asterisk (*) on vertical line OB) and that the transmitter ZA has already switched over to subscriber Q by the time the mutilation is detected. The receiver OA however does not switch over until 4 appears after the repetition cycle is completed, as is also the case for the transmitter ZB and the receiver OB at station B. The repetition cycle transmitted from each station includes the special service signal "I" requesting the repetition and then the last three signals stored in the memory at that station which signals include the address signal "Q" in the repetition from station A.

In FIG. 4 the last signal but one "y" from subscriber P is shown mutilated, and in this case too, the transmitter ZA has already switched over to subscriber Q by the time this mutilation has been signalled back to the transmitter ZA.

Accordingly, in both cases, the switching-over in the receiver is not carried out at a station until the correct distribution interval or switching moment occurs at that station, even if its transmitter ZA at that station has already switched over.

The selecting matrix

FIG. 5 shows the selector circuits in the subscribers' line terminations. Each line terminates in a memory G1 through G*n*, which can deliver a selecting pulse to operate a contact *ct*1 through *ctn*, after the memory has been filled to a certain limit, that is, 25 words or 125 characters. The closing of such a *ct* contact gives an indication that that subscriber seeks connection to an available channel.

In order to prevent two lines from being connected to one channel, or two channels from occupying one line, te circuit of FIG. 5 consists of two continually operating or cycling ring counters R*k* and R*t* provided for example, in parallel with the rows and the columns of an enclosed switching field or matrix of triggers T1.1 through T*n.n*/2. These matrix triggers determine the allotment of the *n*/2 channels to the *n* subscribers. The ring counter R*k* is shown along the left-hand side of matrix comprising *n*/2 channel triggers K1 through K*n*/2, one trigger being provided for each *n*/2 physical channels; and the ring counter R*t* is shown at the bottom of the matrix comprising *n* triggers T1 through T*n*, one trigger being provided for each *n* subscriber. The ring counter R*k* is shifted or stepped by pulses *pk*, and the ring counter R*t* is stepped by pulses *pt*. These pulses *pk* and *pt* are generated, respectively, by the repeaters PK and PT controlled by the oscillators or pulse generators P*k* and P*t*.

Each memory contact *ct*1 through *ctn* is connected to *n*/2 matrix triggers, for example the memory G1 is connected to each of the column of matrix triggers T1.1 through T1.*n*/2, and the memory G2 is connected to each of the column of matrix triggers T1.1 through T1.*n*/2, and the memory G2 is connected to each on the second column of matrix triggers T2.1 through T2.*n*/2, etc., since there are *n*/2 physical channels available for each subscriber. Thus these columns and rows of triggers constitute a selecting matrix, so the trigger switching field consist of $n \times n/2 = \frac{1}{2}n^2$ triggers, each of which is controlled by an AND-gate A1.1 through A*n.n*/2. For example, the column of triggers T1.1 through T1*n* connected to the memory G1 contact *ct*1, is controlled by:

(1) Contact *ct*1 (when closed);

(2) One of the channel ring counting triggers K1 through K*n*/2 (when it is in its "on" state); and (3) The subscriber ring counting trigger T1 (when it is in its "on" state).

The channel ring counter triggers K1 through K*n*/2 constitute a shift register in which at any instant one trigger is in the "on" state, which "on" state shifts through the whole series under the control of the pulses *pk*. Similarly, the subscriber ring counter triggers T1 through T*n* also form a shift register in which at any instant one trigger is in the "on" state, which "on" state shifts through the whole series under the control of the pulses *pt*.

Suppose the switch-over is due to occur every *s* revolution, and all of the $\frac{1}{2}n^2$ triggers of the switching field or matrix are put in their "off" states at the beginning of the revolution *s* or after thirty-two (32) revolutions of the distributor TD in FIG. 2 via pulse *t*32*z*. Suppose also trigger K1 of the shift register K1 through K*n*/2 is in the "on" state, and no pulses *pk* are being supplied, but the energization of any one of the triggers K1 through K*n*/2 via OR-gate O3 starts the repeater PT to start a train of pulses *pt* which are led to the shift register T1 through T*n*. Suppose further that the memory G3 is eligible for connection because its contact *ct*3 is closed, meaning that at least twenty-five signals have been stored therein which are waiting for transmission. Now when a pulse *pt* puts trigger T3 is in the "on" state, trigger T3.1 of the matrix via its AND-gate A3.1 will assume the "on" state also. This means that subscriber 3 is connected to channel 1, which is realized by the energization of coil RS3 from cross-connection 1–3 or (a) of the cross-bar switch in FIG. 6, via conductor from memory G3 and the energization of coil RC1 via OR-gate O2 and AND-gate A3, which cross-bar switch will be described in more detail later in Section 3 below. The change-over from the "off" state to the "on" state of any of the switching field triggers T1.1 through T*nn*/2 interrupts the *pt* pulse train via OR-gate O1 in FIG. 5 and switches on the pulse repeater PK to produce a pulse *pk*. In consequence of this pulse *pk* trigger K1 returns to its "off" state and trigger K2 takes its "on" state.

In the lower part of FIG. 5 it is shown that the transition from the "off" state to the "on" state of any of the triggers K1 through K*n*/2 of the shift register R*k*, via one of the pulses *pks*1 through *pksn* from these triggers through the OR-gate O3, stops the generation of another pulse *pk*, and starts the repetition of pulses *pt* to step the ring counter R*t* triggers T1 through T*n*.

In the above case, trigger T4 is now put in its "on" state. If now memory G4 is also eligible for connection, trigger T4.2 is put in its "on" state which realizes the cross-connection 2–4 or (b) in FIG. 6. Again the energization of trigger T4.2 also stops the repetition of pulses *pt* and starts the repetition of another pulse *pk* which is applied to the shift counter R*k* to stop it.

These alternate stopping actions of the counters R*k* and R*t* are repeated until each of the *n*/2 series of triggers T1.1 . . . T*nn*/2 in the switching field or matrix is in its "on" state, if at least *n*/2 memories or subscribers are eligible for connection.

If $n=32$, it will normally require 512 pulses ($\frac{1}{2}n^2$) to make all the switching field triggers operate. In this case, the repetition frequency of oscillators P*k* and P*t* of five (5) kilocycles per second each will be sufficient to have all the switching field triggers operated in slightly more than 0.1 second and then this occurs for generating the pulses *pt* and *pk* only during the revolution *s*, or *t*32*z* in which the new switching configuration is determined.

Thus the trigger S*z* of each channel operates a different cross-bar connection (see FIG. 6) if the repetition device HI*z* of that channel is not active, the trigger S*z* in the "on" state, and a matrix trigger T1.1 . . . T*nn*/2 in the "on" state to cause the connection of a full memory G1 . . . G*n* to an available channel 1 . . . *n*/2. So in the revolution *s*, the new switching condition is prepared, whereas the definitive switching is insured by each channel individually by the "on" state of the trigger S*z* of that channel serving as a criterion for the actual cross connection. Accordingly, once a certain switching condition is established, it is maintained until the next revolution *s*. Thus in the example described, a subscriber normally gets its connection to a channel for a period sufficiently long for the transmission of thirty-two (32) signals, including the address, which corresponds to thirty-two (32) revolutions of the triggers TD and RD. After these thirty-two revolutions, all the channels are distributed again among all the eligible subscribers, and the preparations for such a re-distribution are effected in the circuit of FIG. 5 during each thirty-second revolution.

In the first revolution after the switching-over, an address code is transmitted in each channel from the address generator ADD with each memory G1 . . . G*n* in FIG. 5, which address code may be repeated in the next revolution, in order to be sure the address is correct.

At the receiving end, when the trigger S*o* has operated, which operates similar to the trigger S*z* and its cross-bar switch as in the transmitter part, the transmitted address code received from the channel is decoded in the circuit AS, after which the channel terminal is connected to the subscriber indicated by the address.

Suppose for another example, the memories of the subscribers G2, G4 and G*n* are filled to the predetermined number of characters so that their contacts *ct*2, *ct*4 and *ctn* are closed.

In the beginning of the thirty-second revolution via input pulse *t*32*z*, the pulse repeater PK is started by the pulse *t*32*z* (from FIG. 2) to deliver the pulses *pk*. The first pulse *pk* causes the trigger K1 to assume its "on" state. Trigger K1 now stops the pulse repeater PK via pulse *pks*1 and OR-gate O3 and also starts the pulse repeater PT delivering the pulses *pt* to search for an available subscriber or closed *ct* contact in the row of triggers T1.1 through T*n*.1 connected to the trigger K1. The first pulse *pt* puts the trigger T1 into its "on" state. When the contact *ct*1 is not closed, the ring counter R*t* makes another step.

The next pulse *pt* puts the trigger T2 into its "on" state and restores trigger T1 to its "off" state or position. The contact *ct*2 is closed, so all the conditions are fulfilled for putting the trigger T2.1 into its "on" state. The trigger T2.1 in its "on" state fulfills a first condition for the subscriber G2 to dispose of channel 1 in due time. (A second condition consists in that the trigger S*z* (FIG. 2) of this channel must be in its "on" state also.)

When operated, trigger T2.1 stops repeater PT and starts pulse repeater PK. The pulse *pk* then puts the trigger K2 of the ring counter R*k* into its "on" state to step to the next possible available channel 2. Trigger K2 while coming into its "on" state stops the repeater PK and restarts the repeater PT. The pulse *pt* puts the trigger T3 into its "on" state. When the contact *ct*3 is not closed, the ring counter R*t* makes another step. The next pulse *pt* puts the trigger T4 into its "on" state. Since contact *ct*4 is closed, all the conditions are fulfilled for trigger T4.2 to assume its "on" state. Trigger T4.2 in its "on" state fulfills a first condition for subscriber G4 to dispose of channel 2 in due time. (But here again, a second condition consists in the trigger S*z* of this channel also being in its "on" state.)

Thus when trigger S*z*2 of this channel is operated, the trigger T4.2 stops repeater PT and starts the repeater PK. The pulse *pk* puts the trigger K3 of the ring counter R*k* into its "on" state for the next available channel 3. Trigger K3 stops the repeater PK and restarts repeater PT. The pulse *pt* puts trigger T*n* in its "on" state. Since the contact *ctn* is closed, all the conditions are fulfilled for the trigger T*n*.3 to assume its "on" state. The trigger T*n*.3 in its "on" state fulfills a first condition for the subscriber G*n* to dispose of channel 3 in due time. (And here again a second condition consists in that the trigger S*zn*/2 of this channel *n*/2 must be in its "on" state also.) According to the above second example, all the preparations or allocations for the redistribution of the channels have taken place in the circuit of FIG. 5.

Cross bar switch

In this second example, there now comes an end of the thirty-second revolution and operation of the cross bar switch in FIG. 6. Suppose the latest user of channel 1 is not repeating according to the second example just described above, and all the conditions are fulfilled for trigger S*z*1 of channel 1 to operate. Now the two conditions (trigger T2.1, FIG. 5, and trigger S*z*, FIG. 2, are both in the "on" state) are fulfilled and channel 1 is allotted and connected to the subscriber G2 memory, by means of the cross connection (c) in FIG. 6.

Suppose further that channel 2 is in repetition so that the corresponding trigger S*z* (FIG. 2) of channel 2 is not in its "on" state and channel 2 cannot yet be connected to subscriber's G4 memory, since trigger S*z* in its "off" state prevents the coil RC2 from being energized so that cross connection (b) cannot be realized. If now after four revolutions (*t*4*z*) this channel is no longer in repetition, this channel's trigger S*z* is in its "on" state and all the conditions are fulfilled now for channel 2 to be allotted and connected to the subscriber G4 memory. But if after the fourth revolution this channel 2 is still in repetition, the new user G4 will have to wait another four revolutions or until the period of repetitions is over.

As regards channel 3 in this second example, it is supposed that this channel 3 is not in repetition. In that case this channel 3 is connected to subscriber G*n* memory after the thirty-second revolution.

Thus, every thirty-two distributor revolutions, the channels are prepared for distribution, that is, allotted anew under the contact of trigger $T32_z$. This new allotment, however, only takes effect after, as a last condition, the repetition device in the relevant channel allows its corresponding trigger S*z* (for channels 1 through 16 in FIG. 2) to assume its "on" state. This is also true for the corresponding triggers S*o* (for the channels 1 through 16) at the receiving station also to be in their corresponding "on" states.

Change-over circuit

When after a selection or distribution period none of the triggers in any one of the channel rows (that is, horizontal rows in FIG. 5 of the matrix of triggers T1.1 . . . T*n*.1*n*/2) are operated, which means that there are more channels available at that moment than subscribers to use them, a relay P′ in the lower part of FIG. 5 is operated. This relay P′ is operated by a trigger PP being put into its "on" state via one of the AND-gates A4 and the OR-gate O4. Contacts *p*′ of relay P′ connects the columns of triggers of the matrix via second contacts *ct*1*a* through *ctna*, which second contacts are operated by the memories G1 through G*n*. These second contacts *ct*1*a* through *ctna* are in parallel, respectively, with the contacts *ct*1 through *ctn*. These second contacts *ct*1*a* through *ctna*, inclusive, are closed when at least one character is stored in its corresponding memory G1 through G*n*. This means that the memories G1 through G*n* filled up to the predetermined number of characters have priority in selecting a channel above the memories in which less than this predetermined number of characters are stored. At the start of every thirty-second revolution, the trigger PP is brought to its "off" state by the pulse *t*32*z*, thus releasing the relay P′ and disconnecting all of the *ct*1*a* through *ct*1*n* contacts from the selecting matrix.

Similarly, a pulse *t*32*z* resets all of the triggers T1.1 through T*n*.*n*/2 of the matrix of FIG. 5 at the end of each thirty-second revolution.

What is claimed is:

1. A varioplex multi-channel telecommunication system for signals between two stations, each station having:
   (1) a transmitter (ZA),
   (2) a receiver (OB),
   (3) an automatic error detector (HIO) and repetition device (HIZ) having a repetition cycle of a given predetermined number of signals,
   (4) *n* subscribers connected to each station, and
   (5) a plurality up to *n*/2 duplex channels between said stations, the improvement comprising:
   (6) means (G1–G*n*) connected to each subscriber for storing signals from that subscriber,
   (7) means (T1.1–T*n*.*n*/2) connected to said storing means for selecting a free channel at the end of regular predetermined intervals, and
   (8) separate means (A1) for each channel connected to each repetition device and each selecting device in that channel for preventing the selection of that channel at the end of any said interval when a repetition cycle is in progress in that channel.

2. A system according to claim 1 wherein said separate selection preventing means includes an AND-circuit (A1) to delay said selection until said repetition cycle is completed.

3. A system according to claim 1 wherein said separate selection preventing means comprises counter means (K1–*n*/2) (T1–*n*).

4. A system according to claim 3 wherein said counter means comprises two counters ($T4_z$, $T32_z$) ($T4_o$, $T32_o$) in each transmitter and in each receiver, which counters are common to and connected (*t*4*z*, *t*4*o*, *t*32*z*, *t*32*o*) to each selecting means in said *n*/2 channels at each station, one counter (R$t$) having $n$ steps and the other counter (R$k$) means having an even fractional number of $n$ steps, said two counters at each station being connected together ($t$4.32.$z$) and controlling (Sz) the connection of a subscribers' stored signals in said transmitter to an available channel only at intervals corresponding to said fractional number of $n$ steps controlled by the repetition cycle from the repetition device associated with that channel.

5. A system according to claim 3 wherein said counting means comprises a distributor in each receiver (RD) and each transmitter (TD) common to and connected to each error detector and repetition device in each channel.

6. A system according to claim 1 wherein said storing means (G1–G$n$) has a predetermined limited capacity.

7. A system according to claim 1 wherein said selecting means comprises a matrix of trigger circuits (T1.1–T$n.n/2$) and two ring counters (R$k$, R$t$) connected via logic circuits to and controlling said matrix by cyclicly searching said triggers therein.

8. A system according to claim 1 wherein said matrix comprises $n^2/2$ triggers.

9. A system according to claim 7 including separate pulse generating means (PK, PT) connected to said ring counters for controlling said ring counters, and means (O1) connected to said matrix for controlling said pulse generating means.

10. A system according to claim 1 wherein said selecting means includes a switching means (RC) connected to and controlled by said matrix for connecting said storing means to a channel transmitter.

11. A system according to claim 1 wherein said predetermined intervals for the operation of said selecting means is determined by counting means ($T4_z$, $T32_z$, $T4_o$, $T32_o$) comprising a distributor (TD, RD) connected to each channel.

12. A system according to claim 11 wherein said counting means comprises two counter circuits connected together and to said distributor, one counter circuit ($T32_z$, $T32_o$) counting a multiple of the other counter circuit ($T4_z$, $T4_o$), and corresponding, respectively, in number of steps to a revolution of said number of subscribers and to a repetition cycle of said error detector and repetition device.

13. A system according to claim 12 wherein said separate means include logic circuits comprising an AND-gate (A1) and trigger circuits (Sz, Az) in each channel circuit, said AND-gate being connected to said two counter circuits, said trigger circuits, and said error detector and repetition devices (HIz) in that channel.

14. A system according to claim 11 wherein said transmitter and said receiver at each station includes said selecting means and said counter means.

15. A system according to claim 14 wherein said selecting means at said receiver at each station includes means (A) responsive to the addresses of the subscribers connected to said receiver.

16. A multi-channel telecommunication system for selectively switching subscriber's signals among available channels between two stations, each channel having:

(a) a transmitter,
(b) a receiver, and
(c) an automatic error detector and repetition device, and each station having:

(d) $n$ subscribers, and
(e) a plurality up to $n/2$ duplex channels between said stations, the improvement comprising in each station:

(A) means connected to each subscriber for storing signals from that subscriber,
(B) matrix means (T1.1–T$n.n/2$) of rows and columns of controlling means connected to said storing means for selecting a free path in any channel for a subscriber having stored signals,
(C) separate ring counter means for said rows and said columns of said selecting means for allotting a subscriber's stored signals to an available channel, and
(D) switch means controlled by the operations of said controlling means of said matrix and via logic circuits by said repetition device associated with said channel only at predetermined intervals for effecting the connections allotted between said stored signals and said available channels.

17. A telecommunication system for signals between two stations, each channel having:

(a) a transmitter (A) having a transmitting distributor (TD),
(b) a receiver (B) having a receiving distributor (RD), and
(c) an automatic error detector (HIz) and repetition (HI$o$) device controlled by said distributors, each station having:

(d) $n$ subscribers connected to each station, and
(e) a plurality up to $n/2$ duplex channels between said stations wherein one path in each direction in each channel is used for connecting two subscribers at different stations, the improvement at each station comprising:

(A) means (G1–G$n$) connected to each subscriber for storing signals from that subscriber,
(B) a first selector means (T1.1–T$n.n/2$) connected to storing means for selecting a free path in any channel for a subscriber having stored signals,
(C) first counter means (R$k$, R$t$) connected to said first selector means giving a first selection condition for allotting the connection of subscriber's stored signals to an available channel,
(D) a second selector means (Sz) for each channel controlling the availability of that channel,
(E) a second counter means ($T4_z$, $T32_z$) connected to said second selector means and to said distributor means for giving a second selection condition for permitting the connection of a subscriber's stored signals to an available channel only at predetermined intervals, and
(F) an AND-gate means (A1) controlled by said repetition devices and said second counter for controllling said second selector means for permitting the connection of a subscriber's stored signals to an available channel only at said predetermined intervals and delaying said allocated connections when there is a repetition procedure going on in that channel at the end of said predetermined interval until an interval when said repetition procedure is ended.

18. An $n/2$ multi-duplex channel telecommunication system for $n$ subscribers between two stations, each channel having:

(1) a transmitter (A) having a transmitting distributor (TD)
(2) a receiver (B) having a receiving distributor (RD) and
(3) an automatic error detector (HIz) and reception (HI$o$) devices controlled by said distributors, the improvement comprising:

(A) means (G1–G$n$) in each transmitter connected to each subscriber for storing a predetermined plurality of signals from that subscriber,
(B) matrix means (T1–T$n$) connected to said storing means for allotting a path in an available channel for a subscriber having stored signals, said matrix having ½$n^2$ connections between said subscribers and said channels,
(C) means (S$o$) in each receiver and connected to each associated subscriber for selecting a called one of said associated subscribers including means (AS) responsive to the address of said called subscriber, (D) two counter means ($T4_z$, $T32_z$) controlled by said distributors and common to said channels in each transmitter and each receiver, one counter means having *n* steps, and the other counter means having an even fractional number of *n* steps, said counting means being connected together, and (E) switching means (RC1–RC*n*) controlled by said counter means and said matrix alloting means to connect a subscriber's stored signals in said transmitter to an available channel only at intervals corresponding to said fractional number of steps controlled by said counter means, which fractional number of steps corresponds to the number of steps in a repetition cycle.

19. A system according to claim 18 wherein said storing means includes means (P′) for changing the number of said predetermined plurality of stored signals depending upon the number of channels available for selection.

20. A system according to claim 18 wherein said counter means includes means (*t*32*z*) for re-setting said matrix every revolution of said counter means.

References Cited

UNITED STATES PATENTS

| | | | |
|---|---|---|---|
| 3,141,928 | 7/1964 | Davey et al. | 340—146.1 |
| 3,252,138 | 5/1966 | Young | 340—146.1 |

THOMAS A. ROBINSON, Primary Examiner

U.S. Cl. X.R.

178—23; 340—146.1

PO-1050
(5/69)

UNITED STATES PATENT OFFICE
CERTIFICATE OF CORRECTION

Patent No. 3,493,678 Dated Feb. 3, 1970

Inventor(s) H. DA SILVA

It is certified that error appears in the above-identified patent and that said Letters Patent are hereby corrected as shown below:

Column 4, line 38, "RC1" should read -- rc 1 -- . Column 5, lines 33 and 34, cancel "column of matrix triggers T1.1 through T1.n/2, and the memory G2 is connected to each on the"; line 70, cancel "is". Column 9, line 20, "1" should read -- 7 --. Column 10, line 29, before "storing" insert -- said --.

SIGNED AND
SEALED
JUN 30 1970

(SEAL)
Attest:

Edward M. Fletcher, Jr.
Attesting Officer

WILLIAM E. SCHUYLER, JR.
Commissioner of Patents